(12) United States Patent
Singh et al.

(10) Patent No.: US 12,005,916 B2
(45) Date of Patent: Jun. 11, 2024

(54) OUT-OF-DOMAIN MONITORING IN PARKED VEHICLES

(71) Applicant: Cerence Operating Company, Burlington, MA (US)

(72) Inventors: Navjot Singh, Montreal (CA); Vasu Jain, Montreal (CA)

(73) Assignee: Cerence Operating Company, Burlington, MA (US)

(*) Notice: Subject to any disclaimer, the term of this patent is extended or adjusted under 35 U.S.C. 154(b) by 127 days.

(21) Appl. No.: 17/088,820

(22) Filed: Nov. 4, 2020

(65) Prior Publication Data

US 2022/0135060 A1 May 5, 2022

(51) Int. Cl.
*B60W 50/14* (2020.01)
*B60R 25/10* (2013.01)
*B60W 40/08* (2012.01)

(52) U.S. Cl.
CPC ........... *B60W 50/14* (2013.01); *B60R 25/10* (2013.01); *B60W 40/08* (2013.01); *B60R 2025/1013* (2013.01); *B60W 2040/0881* (2013.01); *B60W 2050/143* (2013.01)

(58) Field of Classification Search
CPC ............. B60W 50/14; B60W 40/08; B60W 2040/0881; B60W 2050/143; B60R 25/10; B60R 2025/1013
See application file for complete search history.

(56) References Cited

U.S. PATENT DOCUMENTS

| | | | | |
|---|---|---|---|---|
| 5,127,869 | A | * | 7/1992 | Hanzawa ............... A63F 3/0421 446/438 |
| 7,408,445 | B1 | * | 8/2008 | Cunningham .......... B60R 25/00 340/459 |
| 9,227,484 | B1 | * | 1/2016 | Justice ................ B60H 1/00778 |
| 9,743,643 | B1 | * | 8/2017 | Kaplan ................. A01K 29/005 |
| 9,800,983 | B2 | * | 10/2017 | Wacquant .............. H04R 27/00 |
| 11,040,619 | B1 | * | 6/2021 | Martin ..................... G06T 7/593 |
| 2008/0103660 | A1 | * | 5/2008 | Browne ................. G08B 21/22 701/46 |
| 2011/0074565 | A1 | * | 3/2011 | Cuddihy ................ G08B 21/24 340/457 |

(Continued)

FOREIGN PATENT DOCUMENTS

KR 200270303 Y1 * 4/2002
KR 2020087321 A * 7/2020

OTHER PUBLICATIONS

Lee, "Voice Horn of a Vehicle", 2002, Espacenet, English Translation (Year: 2002).*

(Continued)

*Primary Examiner* — Fadey S. Jabr
*Assistant Examiner* — Naeem Taslim Alam
(74) *Attorney, Agent, or Firm* — Occhiuti & Rohlicek LLP

(57) ABSTRACT

In a parked vehicle, a head unit operating in low-power mode draws attention to a living being in a cabin of a parked vehicle. It does so by using a microphone to monitor said cabin for out-of-domain sounds, detecting a signal originating within said cabin, said signal being an acoustic signal that is representative of an out-of-domain sound, classifying said acoustic signal as being indicative of the existence of the living being within said cabin of said vehicle, and sending an alert to a first person.

20 Claims, 3 Drawing Sheets

(56) References Cited

U.S. PATENT DOCUMENTS

| | | | | |
|---|---|---|---|---|
| 2012/0050021 | A1* | 3/2012 | Rao | B60K 28/12 |
| | | | | 340/425.5 |
| 2012/0258683 | A1* | 10/2012 | Stahlin | G08B 27/008 |
| | | | | 455/404.2 |
| 2012/0281853 | A1* | 11/2012 | Dunn | H04R 3/005 |
| | | | | 381/92 |
| 2013/0337762 | A1* | 12/2013 | Buch | H04W 4/44 |
| | | | | 455/404.1 |
| 2014/0217080 | A1* | 8/2014 | Hoke | B60H 1/00864 |
| | | | | 219/203 |
| 2014/0335902 | A1* | 11/2014 | Guba | H04W 4/027 |
| | | | | 381/86 |
| 2016/0200168 | A1* | 7/2016 | Boyer | H04R 19/04 |
| | | | | 701/45 |
| 2018/0339662 | A1* | 11/2018 | Wincek | B60H 1/00878 |
| 2019/0057595 | A1* | 2/2019 | Yamamoto | G08B 21/24 |
| 2019/0057596 | A1* | 2/2019 | Desai | B60Q 5/005 |
| 2019/0102635 | A1* | 4/2019 | Yamamoto | B60R 1/00 |
| 2019/0193590 | A1* | 6/2019 | Labombarda | B60Q 1/52 |
| 2019/0193677 | A1* | 6/2019 | Suzuki | H04L 67/52 |
| 2020/0290567 | A1* | 9/2020 | Funyak | B60R 25/102 |
| 2020/0398640 | A1* | 12/2020 | Chang | B60H 1/00792 |
| 2021/0114485 | A1* | 4/2021 | Ito | B60N 2/002 |
| 2021/0291786 | A1* | 9/2021 | Cisneros | B60R 25/01 |
| 2022/0191769 | A1* | 6/2022 | Breaux, III | H04M 1/72463 |

OTHER PUBLICATIONS

Lee J H, English language translation of KR20200087321A, 2020, Espacenet (Year: 2020).*

* cited by examiner

OUT-OF-DOMAIN MONITORING IN PARKED VEHICLES

FIELD OF INVENTION

This invention relates to automotive safety and in particular to safety of occupants of parked vehicles.

BACKGROUND

A variety of devices are known to assist in providing safety to occupants of vehicles. These range from seat belts to air bags, padded steering wheels, and the like.

Also known are devices that assist in ensuring the safety of a parked vehicle. An example of such a device is an alarm or motion sensor that draws attention to attempts to disturb the vehicle's repose.

SUMMARY

In one aspect, the invention includes a non-abstract method that includes causing a head unit that is operating in a low-power mode in a parked vehicle to draw attention to a living being within that vehicle's cabin. Attention is drawn by having the head unit use a microphone to monitor the cabin for out-of-domain sounds and to detect a signal originating within the cabin, the signal being an acoustic signal that is representative of an out-of-domain sound. The head unit then classifies the acoustic signal as being indicative of the existence of the living being within the cabin of the vehicle and sends an alert to a first person.

In some practices, classifying the acoustic signal as being indicative of the existence of a living being within the cabin of the vehicle comprises determining whether the acoustic signal repeats more than once during a predefined interval.

In some cases, the first person may not respond quickly to an alert. To accommodate this possibility, some practices include after lapse of a defined interval without a response to the first person, sending a signal to a second person. This signal is one that requests rescue of the living being.

When requesting rescue from one who is not familiar with the vehicle or does not know where it is, it is useful to provide information to assist in locating the vehicle. For this purpose, some practices feature the further step of retrieving identifying information to assist a prospective rescuer in identifying the vehicle. This can include awakening a cloud service to retrieve the information from a remote site as well as retrieving location information indicative of a location at which the vehicle is parked. Such information would be available from the vehicle' GPS unit.

To further assist rescuers in finding the vehicle, some practices also feature causing the head unit to repetitively activate the vehicle's external lights or the vehicle's horn. In those vehicles in which it is possible to do so, the head unit connects the microphone to the vehicle's horn or to an external speaker thereof so as to play the acoustic signal outside of the vehicle, thereby alerting passersby to the existence of the living being. These steps are particularly useful in a multi-level parking lot since location information provided by GPS is typically most useful for two-dimensional search.

In some practices, an attempt is made to increase the living being's comfort. This can be carried out by manipulating the cabin's environment. The head unit has a variety of options for doing so, including starting the climate-control system, turning on an air-conditioner, turning on a heater, turning on a fan, or opening a window.

In some practices, classifying the acoustic signal as being indicative of the existence of an living being within the cabin of the vehicle comprises comparing the acoustic signal with stored acoustic signatures.

When operating in low-power mode, it is useful to not use all microphones since doing so will tend to drain the battery too quickly. Accordingly, practices of the invention include those in which using a microphone to monitor the cabin comprises monitoring the cabin using fewer than all available microphones, those in which using a microphone to monitor the cabin comprises monitoring the cabin using different microphones at different times, wherein, at any time, fewer than all available microphones are being used, and those in which using a microphone to monitor the cabin comprises monitoring the cabin using at most only a microphone that is directed to receive sounds from a rear seat of the vehicle.

To promote the chances of an early rescue, it is useful to send the alert signal to those who are would presumably be in the best position to carry out such a rescue. Thus, some practices include sending the alert to a first person comprises identifying a last-known operator of the vehicle, retrieving contact information for the last-known operator, and sending the alert to the last-known operator using the contact information. Other practices features identifying known operators of the vehicle, retrieving contact information for the known operators, and sending the alert to the known operators using the contact information.

In another aspect, the invention features a head unit for installation in a passenger vehicle, the head unit being connected to microphones within a vehicle, the head unit being configured to transition between low-power mode, in which fewer than all microphones in the vehicle are in use, and regular mode, in which all microphones in the vehicle are available for use, wherein the head unit comprises a monitor that is configured to draw attention to a living being in a cabin of the passenger vehicle while the passenger vehicle is parked and the head unit is in low-power mode, the monitor being configured to monitor out-of-domain sounds while the vehicle is parked and to place and to classify an acoustic signal representative of an out-of-domain sound as being indicative of the existence of a living being within the cabin of the vehicle and sending a signal to a person to alert the person.

In yet another aspect, the invention features a tangible and non-transitory computer-readable medium that encodes instructions that, when executed by a processor, cause the performance of any of the methods described herein.

The methods and systems described herein are limited to those that are non-abstract. Descriptions of abstract methods and systems have been omitted. The claims are intended to cover only non-abstract practices and systems. As used herein, Applicant, acting as his own lexicographer, hereby defines "non-abstract" to mean the complement of "abstract" where "abstract" shall be construed to mean that which does not comply with 35 USC 101 as specified by the courts of the United States as of the filing date of this application. As a result, anyone who construes the claims to cover abstract subject matter is construing them in a manner contrary to an express definition in the specification.

The head-unit and all associated computer-readable media are tangible and non-transitory and made of matter, preferably baryonic matter. During operation, the head unit consumes energy and generates waste heat. The method as described herein is carried out in the real world, as opposed to in the imaginary world, and has technical effects. Among these technical effects is that of improving a special-purpose computing system by causing the system to possess an attribute that it did not formerly possess.

BRIEF DESCRIPTION OF THE FIGURES

These and other features will be apparent from the accompanying detailed description, in which.

DETAILED DESCRIPTION

Figure 1:
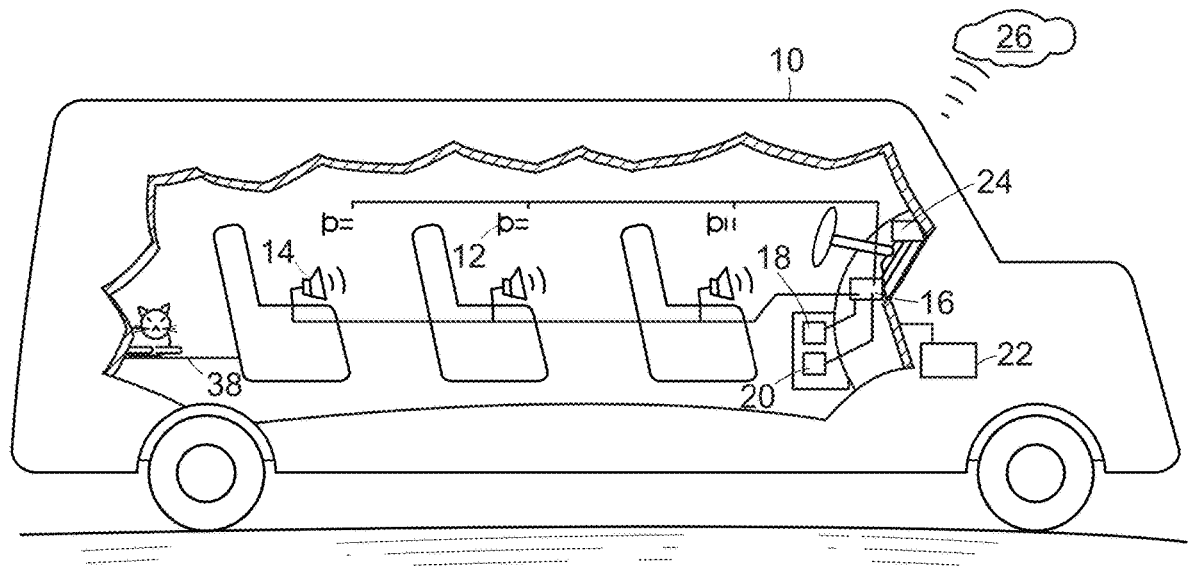
FIG. 1 shows a vehicle having a monitor in communication with a head unit.

FIG. 1 shows a vehicle 10 having plural microphones 12 and speakers 14 that are strategically placed near expected positions of occupants. A multi-purpose head unit 16 provides control over the microphones 12 and the speakers 14 in such a way as to promote more convenient communication between the occupants.

In some embodiments, one or more microphones 12 connects to a speaker or horn of the vehicle 10, thus permitting it to be used as a public-address system. In some embodiments, a microphone 12 is also placed in the vehicle's trunk to permit detection of a living being that has been inadvertently trapped within the trunk.

The head unit 16 also controls various other automotive systems. These include a GPS unit 18, which stores information concerning the vehicle's current location. These also include a climate-control system 20, which provides the head unit 16 with ways to control the cabin's environment, for example by turning on air-conditioning or heat, by turning a fan on or off, or by opening windows by a selected amount. Also among these systems are an entertainment system 22 and a communication device 24, which uses any of a variety of communication modes, such as voice, text, and mail. In some embodiments, the head unit 16 also provides communication with a cloud service 26 from which it retrieves data that may be of use in various applications. Such information can include vehicle-identifying information.

Figure 2:
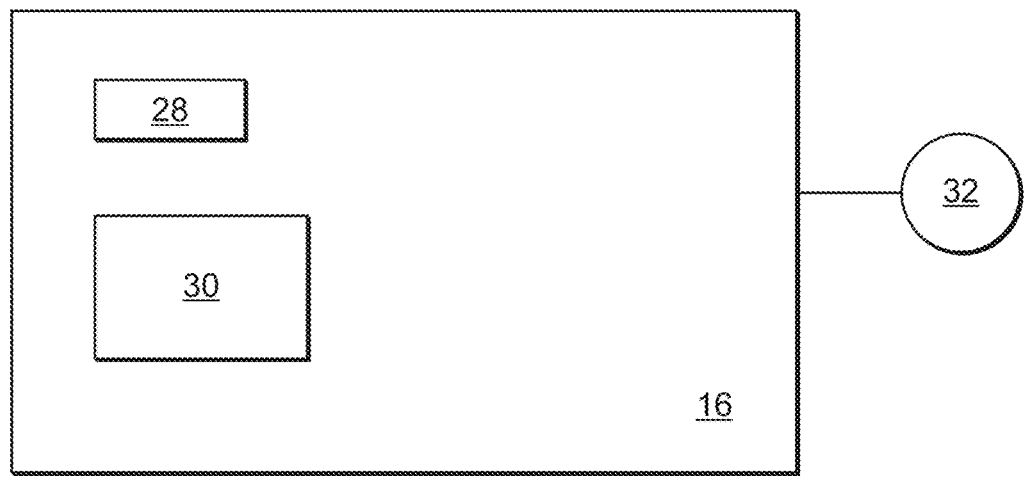
FIG. 2 shows hardware components of the head unit shown in FIG. 1.

Referring to FIG. 2, the head unit 16 comprises electronic hardware in which a processor 28 and a memory 30 are constituents of a special-purpose computer system. Like many components within the vehicle 10, the head unit 16 receives its power from a battery 32 when the vehicle 10 is parked and from an alternator or generator when the vehicle 10 is moving. To avoid draining the battery 32 when the vehicle 10 is parked, the head unit 16 places itself in a low-power mode from which it can rapidly spring into full operation once the vehicle 10 is started.

Figure 3:
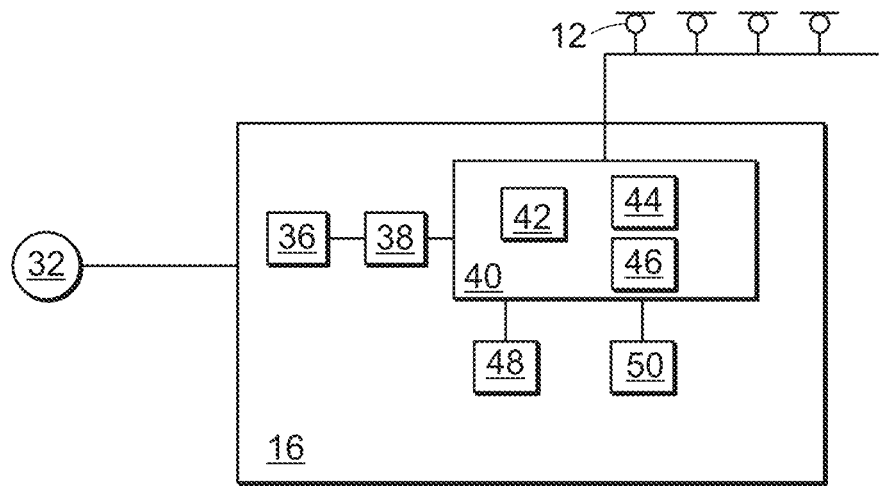
FIG. 3 shows internal architecture of the head unit shown in FIGS. 1 and 2.

Referring now to FIG. 3, The head unit 16 executes a power application 36 that senses whether the vehicle's engine is running or not. The power application 36 provides a signal indicative of the engine's status to a thin client 38. Based on this signal, the thin client 38 causes head-unit software 40 to operate in either low-power mode or regular mode.

The head-unit software 40 includes a speech interface 42, a monitor 44, and a cloud service 46. The head-unit application 40 also provides application-program interfaces 48, 50 that are useful for interacting with various vehicle subsystems as well as for interacting with external systems, such as a phone.

When operating in regular mode, the head-unit software 40 uses all available services. However, when operating in low-power mode, the head-unit software 40 foregoes the use of certain available services in an effort to avoid draining the battery. Typically, only services that relate to the speech interface 42 or to automatic speech-recognition remain in use. Other monitoring services as well as the cloud service 46 are disabled to save power.

The speech interface 42 listens for commands and carries out functions requested by such commands. Such speech commands are generally preceded by a wake-word that signals the speech interface that what comes next is a command. The speech interface 42 thus responds to "in-domain sounds," i.e., sounds that are directed to the speech interface 42. These in-domain sounds are distinct from "out-of-domain sounds," which include ambient conversation not directed to the speech interface as well as background noises.

The monitor 44 listens for the occurrence of certain characteristic out-of-domain sounds. When the engine is not running, the thin client 38 causes the monitor 44 to run in low-power mode. In doing so, the monitor 44 activates only a proper subset of the available microphones 12 and services related to automatic speech-recognition. In a preferred embodiment, the proper subset of microphones 36 consists of at most one microphone 12.

Some embodiments feature a monitor 44 that activates different proper subsets of microphones 12 at different times. This enables the monitor 44 to identify the best signal or to combine the signals in an attempt to enhance the relevant features of the signal. However, only one subset of microphones 36 is being used. A preferred one of such embodiments uses a proper subset that consists of at most one microphone 12.

Among the out-of-domain sounds or particular interest are those that a living being in distress might make. Examples of such distress sounds include the crying of an infant or the whimpering or excessive panting of a dog or cat. The ability to detect sounds of distress provides the monitor 44 with a basis for inferring that a living being 38 may have been inadvertently trapped within the vehicle 10. This can be dangerous because the temperature within a parked vehicle 10 can rapidly move outside a range that is suitable for sustaining life.

In some embodiments, the monitor 44 preferentially activates a microphone 12 that is most likely to be near where a trapped living being 38 is expected to be located. Among these embodiments is a monitor 44 that preferentially activates a microphone 12 that provides coverage of occupants in a rear seat of the vehicle 10.

Figure 4:
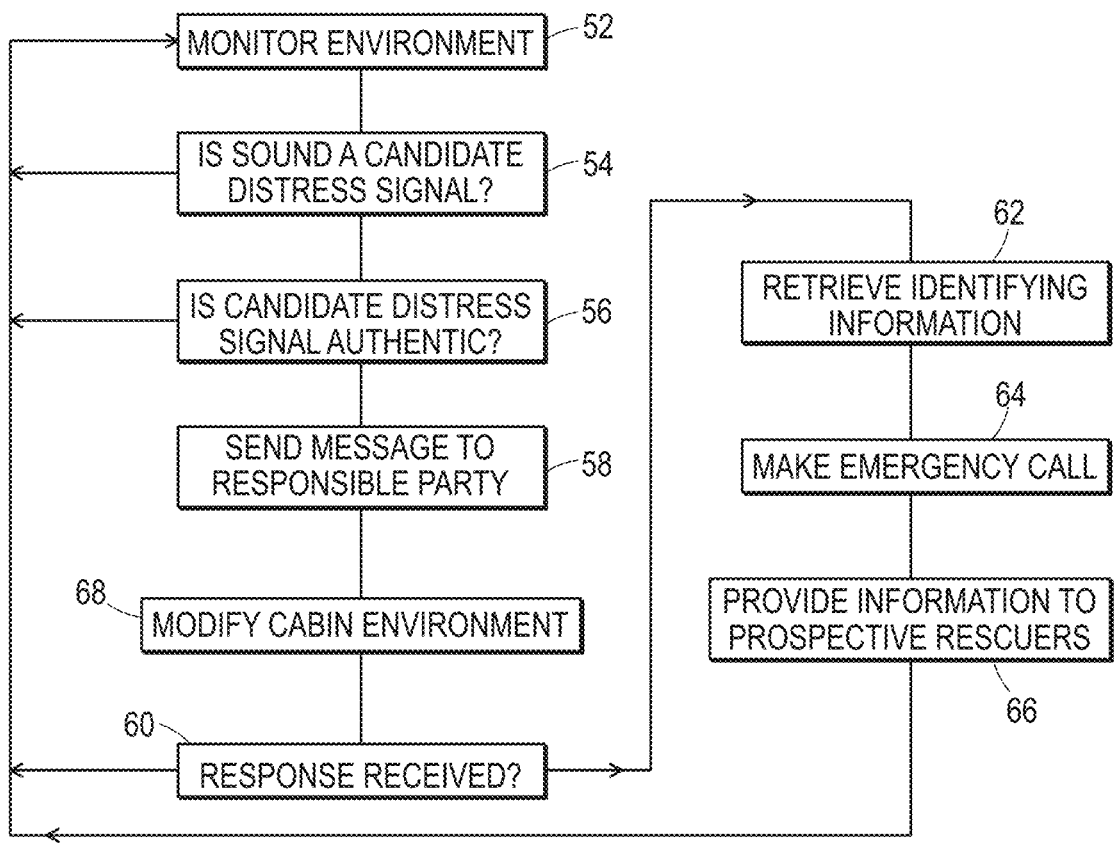
FIG. 4 shows a method carried out by the monitor shown in FIG. 3.

Referring now to FIG. 4, a process carried out by the monitor 44 begins with the monitor 44 entering a monitoring mode (step 52). While in monitoring mode, the monitor 44 detects a sound that could be the sound of a being in distress (step 54). For convenience, such a sound will be referred to as a "candidate distress signal."

In some embodiments, the monitor 44 identifies a candidate distress signal by comparing features of an acquired acoustic signal obtained from the microphone 12 to acoustic signatures that have been pre-loaded into the memory 30. These acoustic signatures include characteristic spectra that are empirically known to be representative of common sounds of distress. Such sounds are selected so that, if played back to a human, it is more likely than not that the human would infer the existence of a living being in distress.

Upon having ascertained the existence of a candidate distress signal, the monitor 44 monitors the candidate distress signal to determine whether it is reasonably persistent over time (step 56). This feature helps avoid false alarms.

If the candidate distress signal turns out to be a transitory signal that is unlikely to be authentic, the monitor 44 returns to monitoring mode (step 52). Otherwise, the monitor 44 instructs the head unit 16 to make a distress call to the vehicle's last-known operator (step 58). Such a call could be in the form of a voice call or a text message. The content of the call is typically a synthesized voice indicating the probable existence of the living being 38. In some cases, a segment of a recording of the now authenticated distress signal is included to evoke a sense of urgency in the listener.

The monitor 44 waits for a waiting period for either a response or for some activity indicative of a rescue attempt (step 60). In some embodiments, the waiting period is pre-set. In others, the monitor 44 uses amplitude and repetition rate of the distress signal to dynamically adjust the waiting period.

Should no response or activity occur within the waiting period, the monitor 44 retrieves information that would be useful for rescuers attempting to find the vehicle 10 (step 62). This would include instructing the head unit 16 to retrieve, from the GPS unit 18, data that is indicative of the vehicle's location. In some cases, the monitor 44 causes temporary activation of the cloud service 26 to retrieve data indicative of the vehicle's identity to assist rescuers, such as the vehicle's make, model, color, or license plate number.

The monitor 44 then initiates a call to an emergency number, such as 9-1-1 (step 64) and provides relevant identifying information to assist in locating the vehicle (step 66).

In some cases, the monitor 44 may take additional steps to assist rescuers in locating the vehicle. This can include causing the vehicle's emergency lights to begin flashing or causing the vehicle's buzzer to make loud periodic sounds that would attract attention within the vehicle's environment.

In an optional step, which can occur at any time after having confirmed the authenticity of the distress call, the monitor 44 takes steps to modify the cabin environment in an effort to promote the distressed occupant's comfort (step 68). This can include instructing the head unit 16 to raise or reduce cabin temperature as required based on a reading from a temperature sensor. As a lower-power alternative to reducing cabin temperature using an air-conditioner, the monitor 44 instructs the head unit 16 to lower the windows by some amount or to operate a fan.

Figure 5:
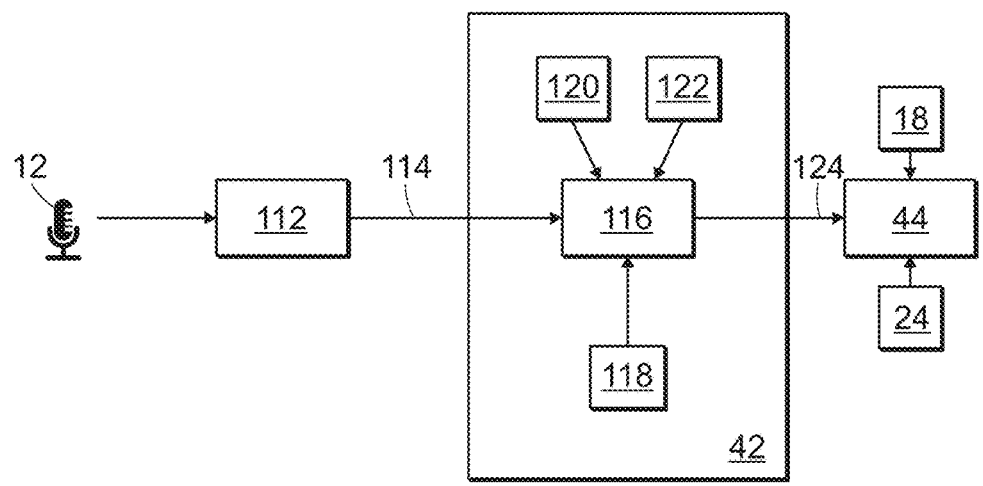
FIG. 5 shows details of the speech interface shown in FIG. 3.

Referring now to FIG. 5, the speech interface 42 receives an audio signal that has been processed by a signal-enhancement unit 112. The signal-enhancement unit 112 receives raw audio input from each of the microphones 12 as well as an audio input from a reference channel. The signal-enhancement unit 112 suppresses any echoes. In addition, the signal-enhancement unit 112 uses the reference channel as a basis for carrying out noise cancellation. The resulting enhanced audio 114 is then provided to the speech interface 42.

The speech interface 42 includes a speech-recognition framework 116 whose function is to distinguish between an in-domain sound and an out-of-domain sound. To do so, the speech-recognition framework 116 relies on a database of sample data 118, information from an embedded automated speech-recognition module 120, and a machine-learning model 122.

The speech-recognition framework 116 classifies the enhanced audio 116 as either an in-domain sound or an out-of-domain sound. It then provides the out-of-domain sounds 124 to the monitor 44, which proceeds to take appropriate action. Such appropriate action includes receiving location information from the GPS unit 18 and interacting with the communication device 24 to formulate a suitable emergency message for transmission.

Figure 6:
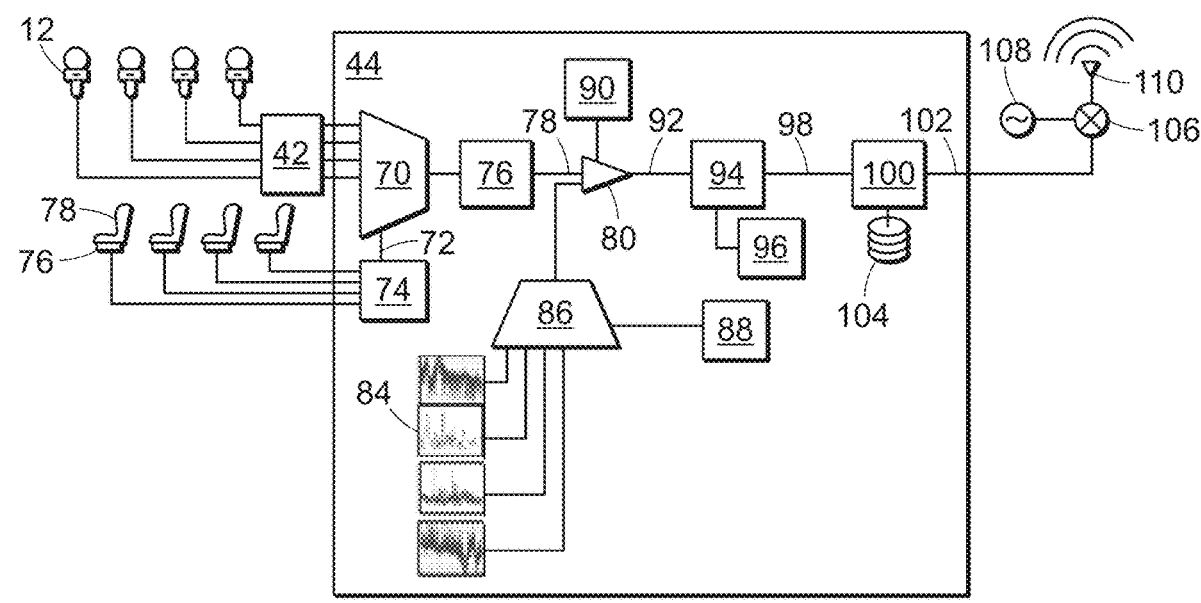
FIG. 6 shows details of the monitor shown in FIG. 3.

FIG. 6 shows details of the monitor 42 that receives the out-of-domain sounds 124 from the speech interface 42 shown in FIG. 5. The output of the speech interface 42 is provided to a first multiplexer 70. The first multiplexer 70 selects a proper subset of the microphones 12 based on a selection signal 72 provided by a microphone selector 74. Embodiments include those in which the microphone selector 74 selects a microphone 12 located at the rear seat. Other embodiments cycle through the microphones 12. The embodiment shown in FIG. 5 features a microphone selector 74 that relies on inputs from weight sensors 76 at each of the vehicle's seats 78 as a basis for selecting a microphone 12.

The first multiplexer 70 provides a signal to a signal-processing module 76 that provides a test signal 78 to a comparator 80. In some embodiments, the signal-processing module 76 carries out an FFT, in which case the test signal 78 is in the frequency domain. In other embodiments, the test signal 78 is in the time domain.

The monitor 44 also has access to several stored signatures 84. The signatures 84 are exemplars of distress calls from various sources, such as a heavily-panting large dog, a heavily-panting lapdog, a cat, and a crying infant. These are provided as inputs to a second multiplexer 86. A signature selector 88 provides each of these signatures 84 to the comparator 80 one a time. For each such signature 84, the comparator 80 compares the test signal 78 with that signature 84 according to a metric 90.

If the comparator 80 deems the test signal 78 to be a candidate distress call 92, it provides it to a classifier 94. The classifier 94 executes a procedure to ensure that the candidate distress call 92 is not a false alarm. For example, it is quite possible for a dog to bark if a person walks too closely to the car. The resulting test signal 78 may match a stored signature 84 closely, but it would not be a genuine distress call.

A useful indicator of a genuine distress call is a frequency with which a test signal 78 repeats itself over time. For this purpose, the classifier 94 receives a signal from a timer 96.

Upon determining that the candidate distress signal 78 is genuine, the classifier 94 sends an instruction signal 98 to a communicator 100, which formulates a suitable message 102 for transmission via the communication device 24. In some embodiments, the message 102 is a text message. In others, the message 102 is a synthesized voice message.

The communicator 100 retrieves an appropriate address from an address database 104. It then encodes the message 102 and provides to a mixer 106, which modulates it with a suitable carrier wave provided by an oscillator 108 and transmits it via an antenna 110.

Having described the invention and a preferred embodiment thereof, what we claim as new and secured by Letters Patent is:

1. A method that is carried out using a head unit in a vehicle, said head unit comprising a monitor, wherein said method comprises said monitor:

transitioning into a monitoring mode thereof, wherein, in said monitoring mode, said monitor uses at least one microphone of said vehicle to listen for out-of-domain sounds indicative of a living being that has been left alone in a cabin of said vehicle after said vehicle has been parked and after said monitor has transitioned into said monitoring mode, wherein, after said monitor has transitioned into said monitoring mode, said monitor executes the steps of:
using at least one microphone to monitor said cabin for out-of-domain sounds,
detecting a signal originating within said cabin, said signal being an acoustic signal that is representative of an out-of-domain sound,
determining that said out-of-domain sound comprises an acoustic signal,
classifying said acoustic signal as being indicative of a living being within said cabin of said vehicle, and
instructing said head unit to send an alert to a first person, said first person being said vehicle's last known operator,
wherein an in-domain sound is a sound directed to a speech interface and an out-of-domain sound is a sound that is not an in-domain sound, wherein said monitor comprises a multiplexer that selects a proper subset of microphones in said vehicle based on a selection signal provided by a microphone selector.

2. The method of claim 1, wherein classifying said acoustic signal comprises receiving a timer signal from a timer and, based at least in part on said timer signal, determining a frequency with which a test signal repeats itself over time.

3. The method of claim 1, further comprising, after lapse of a defined interval without a response to said alert having been received from said first person, causing said head unit to retrieve identifying information to assist a prospective rescuer in identifying said vehicle and sending a signal to a second person, said signal being a signal to request rescue of said living being, wherein causing said head unit to retrieve said identifying information comprises awakening a cloud service and causing said cloud service to retrieve said identifying information from a remote site.

4. The method of claim 1, further comprising, after having sent a signal to a second person, causing said head unit to repetitively activate external lights of said vehicle.

5. The method of claim 1, further comprising, after having sent a signal to a second person, causing said head unit to connect said at least one microphone to a horn of said vehicle so as to play said acoustic signal outside of said vehicle by actuating said horn, thereby alerting passersby to the existence of said living being.

6. The method of claim 1, wherein classifying said acoustic signal comprises comparing said acoustic signal with stored acoustic signatures, said acoustic signatures being exemplars of distress calls.

7. The method of claim 1, wherein said monitor further causes said cabin to be monitored using fewer than all available microphones.

8. The method of claim 1, wherein said monitor carries out a step selected from the group consisting of identifying a best signal for use in classifying said acoustic signal and enhancing relevant features of said acoustic signal, wherein said monitor carries out said step monitoring said cabin using different microphones at different times, wherein, at any time, fewer than all available microphones are being used.

9. The method of claim 1, wherein sending said alert to said first person comprises identifying known operators of said vehicle, retrieving contact information for said known operators, and sending said alert to said known operators using said contact information.

10. An apparatus comprising a head unit for installation in a passenger vehicle,
said head unit being connected to microphones within said passenger vehicle,
wherein said head unit comprises a monitor that is configured to transition into a monitoring mode in which said monitor is configured to use at least one microphone of said vehicle to listen for occurrence of out-of-domain sounds indicative of a living being in a cabin of said passenger vehicle while said passenger vehicle is parked and said monitor is in said monitoring mode,
wherein said monitor comprises a multiplexer that selects a proper subset of microphones in said vehicle based on a selection signal provided by a microphone selector,
said monitor being configured
to use at least one of said microphones to monitor said cabin of said vehicle for said out-of-domain sounds while said vehicle is parked,
to detect a signal originating within said cabin, said signal being an acoustic signal that is representative of an out-of-domain sound,
to classify said out-of-domain sound as being indicative of existence of said living being within said cabin of said vehicle by comparing said acoustic signal with stored acoustic signatures, and
to cause a signal to be sent to a person, said person being said vehicle's last known operator.

11. The method of claim 1, wherein classifying said signal comprises said monitor comparing said acoustic signal to characteristic spectra, said characteristic spectra being empirically known to be representative of sounds of distress, wherein said sounds have been selected such that, if played back to a human, it is more likely than not that the human would infer existence of a living being in distress.

12. The method of claim 1, wherein classifying said signal comprises said monitor comparing said signal with exemplars of distress calls, for each exemplar and using a metric to compare said signal with said exemplar.

13. The method of claim 1, further comprising preloading acoustic signatures into a memory that is accessible by same monitor in said head unit, wherein said memory is located in said vehicle.

14. The method of claim 1, wherein said monitor activates only a microphone that is most likely to be closest to said living being.

15. The method of claim 1, wherein said at least one microphone provides coverage of a rear seat of said vehicle.

16. The apparatus of claim 10, wherein said monitor comprises stored signatures, each of which is an exemplar of a distress call.

17. The apparatus of claim 10, further comprising a classifier that executes a procedure to ensure that said candidate distress call is not a false alarm and a timer that provides a timing signal to said classifier.

18. The apparatus of claim 10, wherein said monitor comprises addresses and a communicator that retrieves an appropriate one of said addresses for receiving said alert and formulates a suitable alert.

19. The apparatus of claim 10, wherein said monitor comprises said microphone selector, a first multiplexer that selects said proper subset of microphones based on a selection signal from said first multiplexer, a signature selector, a second multiplexer that selects one of a plurality of signatures in response to a signal from said signature selector, a comparator that receives said selected signature from said second multiplexer and said a test signal from said first multiplexer, a classifier that receives an output of said comparator, a timer that provides a time signal to said classifier, a communicator that receives an instruction signal from said classifier when said classifier determines that a candidate distress signal is genuine, wherein said communicator is configured to formulate a message selected from the group consisting of a text message and a synthesized voice message, and an address database that comprises addresses, among which is an address to which said message is to be sent as part of said alert.

20. A method that is carried out using a head unit in a vehicle, wherein said method comprises said head unit transitioning into a low-power mode thereof and drawing attention to a living being in a cabin of said vehicle after said vehicle has been parked and after said head unit has transitioned into said low-power mode and a monitor in said head unit has transitioned into a monitoring mode in which said monitor is configured to use at least one microphone of said vehicle to listen for out-of-domain sounds indicative of said living being, wherein drawing said attention comprises, while said head unit is in said low-power mode and said monitor is in said monitoring mode, using, causing said monitor to use only a proper subset of available microphones to monitor said cabin for out-of-domain sounds, detecting a signal originating within said cabin, said signal being an acoustic signal that is representative of an out-of-domain sound, classifying said acoustic signal as being indicative of the existence of said living being within said cabin of said vehicle, and sending an alert to a first person, said first person being said vehicle's last known operator, wherein said monitor comprises a multiplexer that selects said proper subset of microphones in said vehicle based on a selection signal provided by a microphone selector.

\* \* \* \* \*